(12) United States Patent
Monsrud et al.

(10) Patent No.: US 8,313,650 B2
(45) Date of Patent: **\*Nov. 20, 2012**

(54) ZERO WASTE REVERSE OSMOSIS SYSTEM AND DOWNSTREAM RINSING

(75) Inventors: Lee J. Monsrud, Inver Grove Heights, MN (US); Adrian E. Hartz, Woodbury, MN (US)

(73) Assignee: Ecolab USA Inc., St. Paul, MN (US)

( \* ) Notice: Subject to any disclaimer, the term of this patent is extended or adjusted under 35 U.S.C. 154(b) by 0 days.

This patent is subject to a terminal disclaimer.

(21) Appl. No.: 12/967,412

(22) Filed: Dec. 14, 2010

(65) Prior Publication Data

US 2011/0083698 A1    Apr. 14, 2011

Related U.S. Application Data

(63) Continuation of application No. 12/246,657, filed on Oct. 7, 2008, now Pat. No. 7,871,521.

(51) Int. Cl.
*B01D 61/00* (2006.01)
*B01D 63/00* (2006.01)
*B08B 3/00* (2006.01)

(52) U.S. Cl. ............ 210/651; 210/652; 210/195.2; 210/143; 210/175; 134/57 D; 134/109; 134/134; 134/201

(58) Field of Classification Search ............ 210/652, 210/195.2, 134, 143, 257.2, 175; 134/57 D, 134/109, 134, 201
See application file for complete search history.

(56) References Cited

U.S. PATENT DOCUMENTS

| | | | | |
|---|---|---|---|---|
| 3,973,987 | A | \* | 8/1976 | Hewitt et al. ............ 134/12 |
| 4,156,621 | A | \* | 5/1979 | Andrews et al. ......... 134/10 |
| 5,061,374 | A | \* | 10/1991 | Lewis ...................... 210/638 |
| 5,348,588 | A | \* | 9/1994 | Winston ................... 134/10 |
| 5,520,816 | A | | 5/1996 | Kuepper |
| 5,868,937 | A | \* | 2/1999 | Back et al. ............... 210/651 |

(Continued)

FOREIGN PATENT DOCUMENTS

| | | | |
|---|---|---|---|
| DE | 4305020 | A1 | 8/1994 |
| EP | 0133677 | A2 | 3/1985 |
| EP | 0133677 | \* | 6/1995 |
| KR | 20070011513 | A | 1/2007 |
| KR | 20070074069 | A | 7/2007 |
| WO | WO 2005/046420 | A1 \* | 5/2005 |
| WO | WO2005046420 | A1 | 5/2005 |

OTHER PUBLICATIONS

International Search Report and Written Opinion issued in PCT/IB2009/054377, mailed May 13, 2010, 7 pages.

*Primary Examiner* — Ana Fortuna
(74) *Attorney, Agent, or Firm* — Andrew D. Sorensen; Laura C. DiLorenzo; Amy J. Hoffman

(57) ABSTRACT

A system for regulating a reverse osmosis system to obtain zero wastewater. A reverse osmosis apparatus filters water from the fresh water supply into a concentrate rinse stream and a permeate rinse stream. A concentrate storage tank and a permeate storage tank are downstream of the reverse osmosis apparatus and receive the concentrate rinse stream and the permeate rinse stream, respectively. A concentrate solenoid valve and a permeate solenoid valve control the flow of the concentrate rinse stream and the permeate rinse stream from their respective storage tank. An institutional dishmachine receives the concentrate rinse stream and the permeate rinse stream during a rinse cycle of the institutional dishmachine. A control system is operatively connected to the concentrate solenoid valve and the permeate solenoid valve and control flow of the rinse streams into the institutional dishmachine.

20 Claims, 1 Drawing Sheet

U.S. PATENT DOCUMENTS

| | | |
|---|---|---|
| 5,976,363 A | 11/1999 | Monroe et al. |
| 6,074,551 A | 6/2000 | Jones et al. |
| 6,327,731 B2 * | 12/2001 | Back et al. .................... 8/158 |
| 7,000,437 B2 * | 2/2006 | Raney et al. ................ 68/18 F |
| 7,285,210 B2 * | 10/2007 | Schmitt .................... 210/195.2 |
| 7,337,635 B2 * | 3/2008 | Cerruti et al. ............... 68/17 R |
| 7,510,658 B2 * | 3/2009 | Gordon ........................ 210/652 |
| 7,708,837 B2 * | 5/2010 | Kuran et al. .................... 134/18 |
| 7,735,805 B2 * | 6/2010 | Cornell ........................ 251/205 |
| 7,871,521 B2 | 1/2011 | Monsrud et al. |
| 2005/0040087 A1 | 2/2005 | Jacuzzi |

* cited by examiner

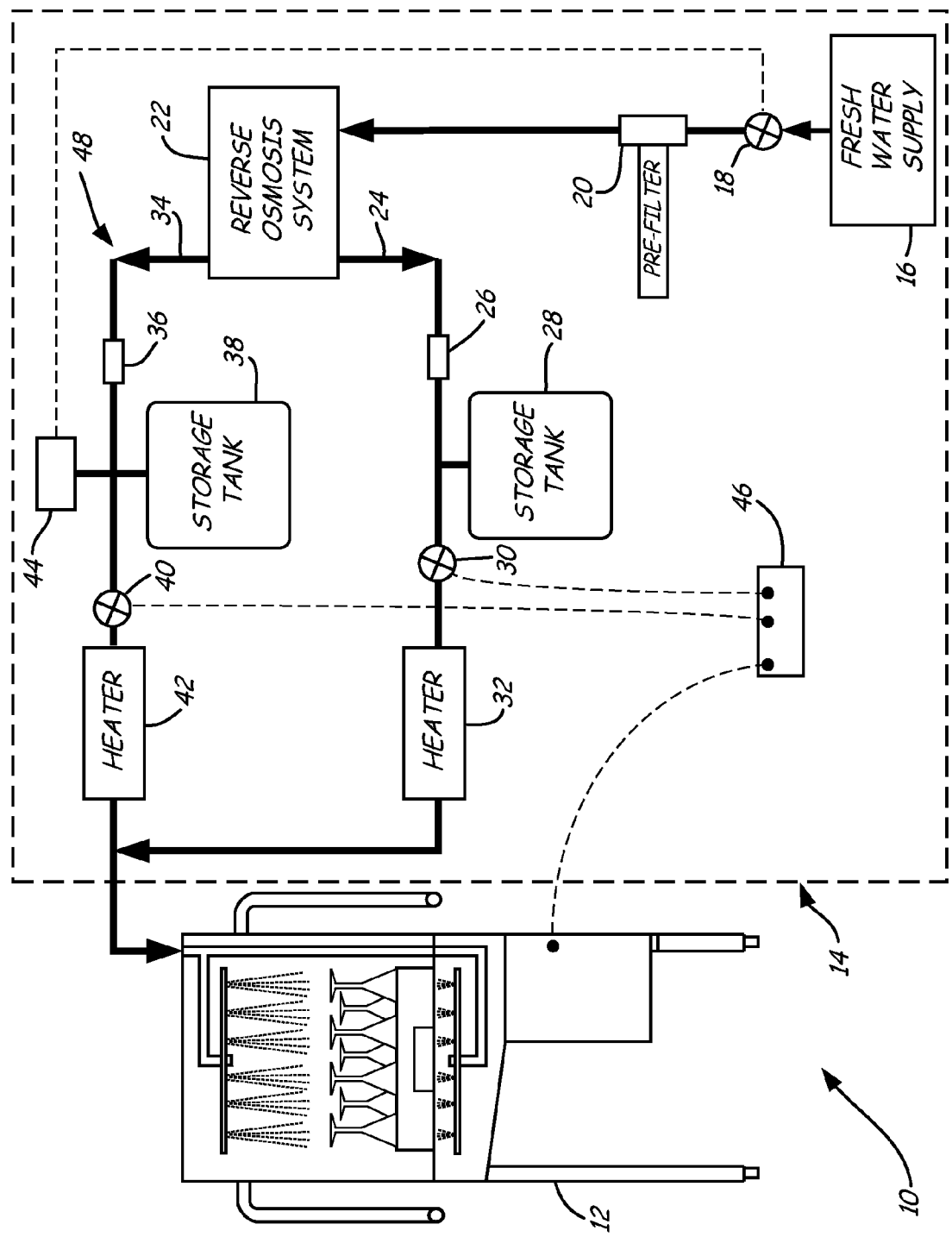

ZERO WASTE REVERSE OSMOSIS SYSTEM AND DOWNSTREAM RINSING

CROSS-REFERENCE TO RELATED APPLICATION

This application is a continuation of U.S. patent application Ser. No. 12/246,657, filed Oct. 7, 2008, now U.S. Pat. No. 7,871,521, entitled Zero Waste Reverse Osmosis System and Downstream Rinsing, which is herein incorporated by reference in its entirety.

FIELD OF THE INVENTION

The present invention relates generally to the field of reverse osmosis systems used in conjunction with institutional dishmachines. In particular, the present invention relates to a system for eliminating wastewater produced by a reverse osmosis system connected to an institutional dishmachine. A method of using the reverse osmosis system is also provided.

BACKGROUND

During the rinse step of a dishwashing cycle, fresh water is sprayed onto the dishware to rinse food soils and detergent from the surface of the dishware. When the fresh water is relatively low in dissolved solids (i.e., minerals in the water), the dishware appears substantially film-free and spot-free after it dries. However, when the fresh water contains high levels of dissolved solids, the dried dishware can have a significant amount of visible film and spots due to the minerals in the water. The solids remain on the dishware after the water evaporates, leaving behind rather unsightly film and spots, especially on glassware, flatware, and dark-colored dishware items.

Reverse osmosis is an effective mechanism for removing dissolved solids from water in areas that have high levels of dissolved solids in the water. However, reverse osmosis systems by nature waste water because to maintain the membrane of the system in functional working condition, the membrane surface is periodically flushed with water, which is subsequently discarded. The concentrate (wastewater) is passed at high flow rates across the membrane surface to remove solids from the surface to prevent the membrane from getting plugged and fouled. If 100% of the water were forced through the membrane, the membrane life would be reduced and the flow of water (production of permeate) would be severely reduced. Therefore, the most efficient way to operate a reverse osmosis system is to waste a certain amount of water.

There are various ways to reduce the amount of wastewater from a reverse osmosis system, including recycling the concentrate water back to the reverse osmosis feed and using multiple membranes in series. However, for practical purposes, the reverse osmosis system will still create some wastewater. In the current state of the art for a commercial reverse osmosis system, a ratio of about 50% permeate to about 50% concentrate has been found to provide an effective balance for allowing a reverse osmosis system to operate in a wide variety of water conditions while minimizing the amount of equipment involved in the overall system.

SUMMARY

In an embodiment, the present invention relates to a method of eliminating wastewater in a reverse osmosis apparatus connected to an institutional dishmachine. The method includes introducing a water stream into the reverse osmosis apparatus to split the water stream into a permeate rinse stream and a concentrate rinse stream, rinsing dishware in a rinse cycle of the institutional dishmachine with the concentrate rinse stream and subsequently rinsing the dishware in the rinse cycle of the institutional dishmachine with the permeate rinse stream. The ratio of the concentrate rinse stream to the permeate rinse stream is about 3:2 or less. The permeate rinse stream has a total dissolved solids concentration of about 200 parts per million or less.

In another embodiment, the present invention relates to a reverse osmosis system connectable to an institutional dishmachine. The reverse osmosis system includes a fresh water supply, a reverse osmosis apparatus for splitting water from the fresh water supply into a concentrate stream and a permeate stream; a concentrate storage tank and a permeate storage tank downstream of the reverse osmosis apparatus for receiving the concentrate stream and the permeate stream, respectively; a heater for heating the permeate stream to a predetermined temperature; and a control system for selectively controlling flow of the concentrate stream and flow of the permeate stream such that the reverse osmosis system produces zero wastewater.

In another embodiment, the present invention relates to a system for regulating a reverse osmosis apparatus to obtain zero wastewater. The system includes a fresh water supply, a reverse osmosis apparatus, a concentrate storage tank and a permeate storage tank, a concentrate solenoid valve and a permeate solenoid valve, a permeate heater, an institutional dishmachine and a control system. The reverse osmosis apparatus filters water from the fresh water supply into a concentrate rinse stream and a permeate rinse stream. The concentrate storage tank and the permeate storage tank are located downstream of the reverse osmosis apparatus and receive the concentrate rinse stream and the permeate rinse stream, respectively. The concentrate solenoid valve and the permeate solenoid valve control the flow of the concentrate rinse stream and the permeate rinse stream, respectively, from its respective storage tank. The heater heats the permeate rinse stream to a predetermined temperature. The institutional dishmachine successively receives the concentrate rinse stream and the permeate rinse stream during a single rinse cycle of the institutional dishmachine. The control system is operatively connected to the concentrate solenoid valve and the permeate solenoid valve and controls flow of the rinse streams into the institutional dishmachine.

BRIEF DESCRIPTION OF THE FIGURE

The FIGURE is a schematic view of a zero waste dishwashing system, according to one embodiment of the present invention.

While the invention is amenable to various modifications and alternative forms, specific embodiments have been shown by way of example in the drawings and are described in detail below. The intention, however, is not to limit the invention to the particular embodiments described. On the contrary, the invention is intended to cover all modifications, equivalents, and alternatives falling within the scope of the invention as defined by the appended claims.

DETAILED DESCRIPTION

The sole FIGURE shows a schematic view of a zero waste dishwashing system 10 including an institutional dishmachine 12 with an integrated reverse osmosis system 14. The dishwashing system 10 reduces and/or eliminates wastewater associated with conventional reverse osmosis systems by splitting a fresh water stream into two rinse streams, a concentrate rinse stream and a permeate rinse stream. The concentrate rinse stream and the permeate rinse stream are then used to rinse dishware during a single, discrete rinse cycle of the institutional dishmachine. Thus, rather than discarding the concentrate, or wastewater, created from the reverse osmosis system 14, the concentrate is used in a first part of the rinse cycle and the permeate, or purified water, is used in a second part of the rinse cycle. The dishwashing system 10 of the present invention achieves substantially the same warewashing results as an institutional dishmachine 12 using a reverse osmosis system that conducts the entire rinse cycle using only permeate. Because the reverse osmosis system 14 utilizes wastewater at the same rate at which it is produced, the reverse osmosis system 14 is self-regulating and can be operated with zero wastewater, regardless of how often the institutional dishmachine 12 operates during a particular hour or day. In addition, the reverse osmosis system 12 also reduces energy consumption of the dishwashing system 10 during the rinse cycle of the institutional dishmachine 12.

The institutional dishmachine 12 may be any rinsing apparatus or conventional institutional dishmachine used to wash dishware in commercial settings, for example, a door-type dishmachine, a glass washing dishmachine or an undercounter dishmachine. An entire run for the institutional dishmachine 12 typically lasts between about 60 seconds and about 90 seconds and is generally broken into a single wash cycle and a single rinse cycle. Typically, the wash cycle lasts between about 30 seconds and about 60 seconds and the rinse cycle lasts between about 8 seconds and about 30 seconds. Optionally, there is a dwell or pause time after each of the wash and rinse cycles lasting between about 5 seconds to about 10 seconds.

During the wash cycle, water is recirculated from a wash tank over the dishware using a pump located in the institutional dishmachine 12. The water typically includes chemicals for cleaning the dishware. The flow rate of the (pumped) recirculated wash water is typically between about 60 gallons per minute and about 200 gallons per minute.

After the dishware has been cleaned during the wash cycle, any food particles and chemicals are rinsed from the surface of the dishware during the rinse cycle. While the water used during the wash cycle is recirculated water, the water used during the rinse cycle is fresh water and is first passed through the reverse osmosis system 14 before being sent to the institutional dishmachine 12. In one embodiment, water is introduced into the institutional dishmachine 12 during the rinse cycle at a flow rate of between about 4 gallons per minute and about 8 gallons per minute.

The reverse osmosis system 14 is automatically balanced in that the reverse osmosis system 14 uses substantially exactly the amount of fresh water that is introduced into the dishwashing system 10. Even though the reverse osmosis system 14 is integrated with the institutional dishmachine 12, the dishwashing system 10 uses the same amount of water to rinse the dishware in the institutional dishmachine 12 as if no reverse osmosis system 14 were present. The footprint of the reverse osmosis system 14 can therefore be downsized from conventional reverse osmosis systems by about one half because it only has to supply half the amount of permeate water in each rinse cycle. The concentrate water, normally discarded as wastewater, is used for the other half of the rinse cycle, thus using only half of the permeate water and resulting in a system that is approximately half as large as a conventional reverse osmosis system. Equipment used in or in conjunction with the reverse osmosis system 14, such as a pre-filter, reverse osmosis membranes, water storage tanks, and heaters can all be downsized by about 50%, resulting in a much smaller overall system.

In addition, as the dishwashing system 10 uses the same amount of water and the same cycle times as an institutional dishmachine that does not include a reverse osmosis system, the institutional dishmachine 12 does not need to be changed to be used in conjunction with the reverse osmosis system 14. The reverse osmosis system 14 can thus be integrated with conventional institutional dishmachines with very little to no alterations to the institutional dishmachine 12.

The reverse osmosis system 14 is connected to the institutional dishmachine 12 and includes a fresh water supply 16, an inlet solenoid valve 18, a pre-filter 20, a reverse osmosis apparatus 22, a concentrate supply line 24, a concentrate check valve 26, a concentrate storage tank 28, a concentrate solenoid valve 30, a concentrate heater 32, a permeate supply line 34, a permeate check valve 36, a permeate storage tank 38, a permeate solenoid valve 40, a permeate heater 42, a pressure switch 44, a control system 46 and a circulation system 48 for transporting water through the reverse osmosis system 14. Generally, water flows from the fresh water supply 16 and through the pre-filter 20 before reaching the reverse osmosis apparatus 22. The reverse osmosis apparatus 22 separates the water into a permeate rinse stream and a concentrate rinse stream. The water from each of the rinse streams is collected in its respective storage tank 28, 38 until the institutional dishmachine 12 calls for the water during the rinse cycle. Each of the concentrate solenoid valve 30 and the permeate solenoid valve 40 receives a signal in successive order to open and allow water to flow from the concentrate and permeate storage tanks 28, 38 to the institutional dishmachine 12 to rinse the dishware in the institutional dishmachine 12.

The inlet solenoid valve 18 controls the amount of water that enters the reverse osmosis system 14 from the fresh water supply 16. The water in the fresh water supply 16 is sourced by the building that the dishwashing system 10 is located in, and can be, for example, well water. The water from the fresh water supply 16 can be supplied at building line pressure, or the pressure can be boosted by a high pressure pump to increase the production rate and the water efficiency level. Depending on the location, the total dissolved solids (TDS) of the water will vary. The term "dissolved solids" refers to the presence of various minerals, metals, and salts in the water. In general, high-solids water refers to water having a total dissolved solids concentration in excess of about 300 ppm. However, high-solids water often has a TDS concentration in excess of about 500 ppm, and even in excess of about 800 ppm. Although all locations have at least some solids dissolved in the water, the TDS tends to vary from one location to another.

The pre-filter 20 is located downstream from the fresh water supply 16 and filters out sediment and removes chlorine from the water flowing from the fresh water supply 16 before the water enters the reverse osmosis apparatus 22. Both sediments and chlorine are harmful to the membrane in the reverse osmosis apparatus 22 and can reduce the life of the membrane. Any pre-filter that is capable of filtering out sediment and chorine from water can be used with the reverse osmosis system 14. Although FIG. 1 depicts only one pre-filter 20, the reverse osmosis system 14 may include any number of pre-filters without departing from the intended scope of the present invention. For example, if the water from the fresh water supply 16 has a high concentration of sediment and/or chorine, a number of pre-filters may be positioned in series upstream of the reverse osmosis apparatus 22 to ensure that the concentration of the sediment and/or chorine entering the reverse osmosis apparatus 22 is not at a detrimental level to the membrane in the reverse osmosis apparatus 22.

After the water has been passed through the pre-filter 20, the water enters the reverse osmosis apparatus 22. The reverse osmosis apparatus 22 splits the water from the fresh water supply 16 into a concentrate rinse stream containing concentrate and a permeate rinse stream containing permeate. The concentrate and permeate rinse streams are directed through the concentrate supply line 24 and the permeate supply line 34 to the concentrate storage tank 28 and the permeate storage tank 38, respectively. As the water flows through the reverse osmosis apparatus 22, the original TDS concentration of the fresh water from the fresh water supply 16 is filtered to create the concentrate rinse stream and the permeate rinse stream such that the TDS concentration of the concentrate rinse stream is substantially higher than the original TDS concentration and the TDS concentration of the permeate rinse stream is substantially lower than the original TDS concentration. For example, after passing through the reverse osmosis apparatus 22, a fresh water supply 16 having a TDS concentration of about 450 ppm may be outputted as concentrate rinse stream having a TDS concentration of between about 600 ppm and about 1000 ppm and a permeate rinse stream having a TDS concentration of between about 50 ppm and 200 ppm. As the TDS concentration of the permeate rinse stream decreases, the TDS concentration of the concentrate rinse stream increases. The reverse osmosis apparatus 22 is particularly set such that the permeate rinse stream effectively rinses dishware without leaving spots, films or streaks. In some embodiments, the reverse osmosis apparatus 22 is set such that the permeate rinse stream has a TDS concentration of about 200 ppm or less, about 150 ppm or less, about 100 ppm or less, or about 50 ppm or less.

The reverse osmosis apparatus 22 is a membrane filter and may include more than one membrane. The membranes may be hollow fiber or spiral wound. Examples of suitable materials used to produce the membranes include cellulose triacetate (CTA), cellulose acetate (CA), polyamide and thin film composite (TFC). The membranes can also be considered standard pressure (high pressure) or low energy (low pressure). Examples of commercially available reverse osmosis membranes include spiral-wound TFC membranes, model number XLE-4021 (low energy) and TW30-4021 (high energy), available from Filmtec, Midland Mich. While the dishwashing system 10 is discussed as including a reverse osmosis apparatus 22 to filter an inlet stream into a concentrate rinse stream and a permeate rinse stream, any filtration apparatus that results in a concentrate rinse stream and a permeate rinse stream may be used without departing from the intended scope of the present invention. For example, other membrane filtration apparatuses that can be used in conjunction with the dishwashing system 10 include nanofiltration apparatuses, ultrafiltration apparatuses and microfiltration apparatuses. An example of a commercially available nanofiltration membrane includes model number M-N4021A9, available from AMI, Vista, Calif. The particular type of apparatus that is used in the dishwashing system 10 will depend on the degree of filtration needed for the particular application and the particular source water quality.

The concentrate and permeate check valves 26, 36 are located upstream of the storage tanks 28, 38 and prevent water from flowing backwards from the concentrate and permeate storage tanks 28, 38, respectively, to the reverse osmosis apparatus 22.

The concentrate and permeate storage tanks 28, 38 store the concentrate and permeate, respectively, until needed by the institutional dishmachine 12. The storage tanks 28, 38 can be pressurized tanks or atmospheric tanks. Alternatively, the concentrate and permeate storage tanks 28, 38 may not be needed if the production rate of the reverse osmosis apparatus 22 is high enough to deliver the flow rate required for the particular application. However, a reverse osmosis system 14 without concentrate and permeate storage tanks 28, 38, or with only small concentrate and permeate storage tanks 28, 38, would need to be physically larger to produce water at a faster, on demand rate.

When the permeate storage tank 38 is full, the pressure switch 44 connected to the permeate storage tank 38 sends a signal to the inlet solenoid valve 18 to close in order to stop the supply of water from the fresh water supply 16 into the reverse osmosis system 14. With the inlet solenoid valve 18 closed, the fresh water supply 16 no longer delivers water through the reverse osmosis apparatus 22 to either the concentrate storage tank 28 or the permeate storage tank 38. While the pressure switch 44 is depicted in the FIGURE as being connected to the permeate storage tank 38, alternatively, the pressure switch 44 may be located on the concentrate storage tank 28, or on both storage tanks 28, 38 without departing from the intended scope of the present invention. If the concentrate and permeate storage tanks 28, 38 are atmospheric tanks, the pressure switch 44 is replaced by a float switch, with the same general purpose of shutting off the reverse osmosis system 14 when the storage tanks 28, 38 are full or reach a pre-set pressure or height.

The concentrate and permeate heaters 32, 42 are located downstream from their respective storage tanks 28, 38 and vary in their temperature settings depending on the type of sanitization that the institutional dishmachine 12 is set up for. For example, the heater temperatures may be set to about 120° F. for chemical sanitizing or about 180° F. for hot water sanitizing. For a high temperature sanitizing machine, the rinse water typically needs to be heated to about 180° Fahrenheit (° F.) to meet regulatory agency sanitization standards. By splitting the freshwater stream into a separate concentrate rinse stream and permeate rinse stream, the concentrate rinse stream may be heated to a lower temperature while the permeate rinse stream is heated to about 180° F. and still comply with regulatory agency sanitization standards. In one embodiment, the concentrate stream is heated to about 165° F. Because the entire volume of rinse water is not heated to the higher 180° F. temperature, there is an overall reduction in energy used during the rinse cycle. Although the sole FIGURE depicts the reverse osmosis system 14 as including a concentrate heater 32 and a permeate heater 42, the heaters 32, 42 are optional depending on the sanitizing method used in the institutional dishmachine 12. For example, in some chemical sanitizing institutional dishmachines, the heaters 32, 42 are not necessary because the chemicals typically require a cold water sanitizing rinse. In some embodiments, the reverse osmosis system 14 may include the permeate heater 42 but not the concentrate heater 32 if the permeate heater 42 can heat the permeate to a temperature sufficient to sanitize the dishware. The prime energy savings comes from the fact that only half of the water used during the rinse cycle needs to be heated. Thus, an energy savings of up to about 50% can be obtained on the largest energy consuming component of the dishwashing system 10. The concentrate heater 32 may also not be needed if the concentrate can harness heat from another source such that it does not need to be directly heated. In one embodiment, the concentrate heater 32 harnesses the waste heat from the permeate heater 42, thus saving energy and eliminating the need for a concentrate heater.

The control system 46 is operatively connected to the institutional dishmachine 12 and the concentrate and permeate solenoid valves 30, 40 to selectively control the flow of concentrate from the concentrate storage tank 28 and the flow of permeate from the permeate storage tank 38 to the institutional dishmachine 12.

When a wash and rinse run of the institutional dishmachine 12 reaches the rinse cycle, the institutional dishmachine 12 sends a signal to the control system 46. In one embodiment, the control system 46 sends a 10 second rinse signal that powers the concentrate and permeate solenoid valves 30, 40 to divide the rinse cycle into two portions. When first energized by the rinse signal from the institutional dishmachine 12, the control system 46 sends a power signal to the concentrate solenoid valve 30 to open the concentrate solenoid valve 30, allowing the concentrate to flow into the institutional dishmachine 12 to rinse the dishware in the institutional dishmachine 12 during the first portion of the rinse cycle. The concentrate solenoid valve 30 remains open for a pre-set period time, for example between 0 seconds and 9 seconds. In one embodiment, the concentrate solenoid valve 30 is open for about 5 seconds.

After the signal to the concentrate solenoid valve 30 is completed, the control system 46 then sends a power signal to open the permeate solenoid valve 40, allowing the permeate to flow into the institutional dishmachine 12 to rinse the dishware in the institutional dishmachine 12 during the second portion of the rinse cycle. The signal to the permeate solenoid valve 40 occurs immediately following the signal to the concentrate solenoid valve 30 and also lasts for a pre-set period of time, for example between 1 seconds and 10 seconds, depending on the length of the signal to the concentrate solenoid valve 30. Generally, the concentrate solenoid valve 30 is open for C seconds and the permeate solenoid valve 40 is open for (R-C) seconds, where C is the length of the signal to the concentrate solenoid valve 30 and R is the maximum length of the rinse cycle. For example, if R is 10 seconds and the concentrate solenoid valve 30 is open for 5 seconds (C), then the permeate solenoid valve 40 is open for 5 seconds. In one embodiment, the concentrate solenoid valve 30 and the permeate solenoid valve 40 are open at a time ratio of at least about 3:2 and particularly at a time ratio of at least about 1:1. In one embodiment, the control system 46 is a timer.

Generally, two factors control the ability of the concentrate rinse stream and the permeate rinse stream to effectively rinse dishware located in the institutional dishmachine 12, 1) the TDS concentration of the permeate rinse stream and 2) the amount of time the concentrate is used to rinse the dishware during the rinse cycle relative to the amount of time the permeate is used to rinse the dishware during the rinse cycle, or the time ratio of concentrate to permeate. As the TDS concentration of the permeate rinse stream decreases, the time ratio of concentrate to permeate can increase while still achieving the same cleaning results. For example, a rinse cycle using a permeate rinse stream having a TDS concentration of about 50 ppm, at a concentrate to permeate time ratio of about of about 3:2, will clean dishware substantially as effectively as a rinse cycle using a permeate rinse stream having a TDS concentration of about 100 ppm, at a concentrate to permeate time ratio of about 2:3. Thus, the TDS concentration of the permeate rinse stream and the time ratio of concentrate to permeate are related such that the time ratio of concentrate to permeate may be varied depending on the TDS concentration of the permeate rinse stream.

Although the rinse cycle is discussed as being divided into two parts according to a time ratio to introduce the concentrate rinse stream and the permeate rinse stream into the institutional dishmachine 12, the rinse cycle may be split according to a number of variables. For example, the rinse cycle may be discussed as being split according to a percentage of the total volume of water used in the rinse cycle of the institutional dishmachine 12. In one embodiment, for an institutional dishmachine using a total of 1 gallon of water during the rinse cycle, the concentrate stream may constitute about 60% or less of the total rinse cycle. This would substantially be the equivalent of a concentrate rinse stream to permeate rinse stream time ratio of about 3:2.

After the signal to the permeate solenoid valve 42 terminates, the rinse signal from the institutional dishmachine 12 is terminated, ending the rinse cycle and completing the wash and rinse run of the institutional dishmachine 12. Although the control system 46 is described as controlling the amount of time the concentrate and permeate solenoid valves 30, 40 are open, the control system 46 can optionally measure and/or control a number of variables, for example, the TDS concentration of the concentrate rinse stream and the permeate rinse stream and the flow rate of the concentrate rinse stream and the permeate rinse stream.

EXAMPLES

The present invention is more particularly described in the following examples that are intended as illustrations only, since numerous modifications and variations within the scope of the present invention will be apparent to those skilled in the art. Unless otherwise noted, all parts, percentages, and ratios reported in the following examples are on a weight basis, and all reagents used in the examples were obtained, or are available, from the chemical suppliers described below, or may be synthesized by conventional techniques.

Test Method

An institutional dishmachine was prepared for use under normal operating procedures. The institutional dishmachine was set to automatically dispense and maintain a normal amount of detergent and rinse additive. The institutional dishmachine was allowed to reach normal operating temperature. A first water storage tank was filled with concentrate water having a TDS concentration of about 750 ppm and a second water storage tank was filled with permeate water having a TDS concentration of about 50 ppm, about 100 ppm, about 150 ppm or about 200 ppm, depending on the test condition.

For each test condition, a set of 4 glasses was placed into the institutional dishmachine. A complete wash and rinse run was conducted with the institutional dishmachine running automatically and the timer sequenced with the appropriate rinse water type and time. As soon as the entire dishwashing run was complete, the glassware was removed and allowed to air dry under ambient conditions.

Once dry, the glasses were rated using three ratings of spot, film and streak. A focused light source was used to exaggerate the spots, film and streaks so that subtle differences between conditions could be detected. Each glass was rated on a scale of 1 to 5 with respect to each of these properties. A rating of 1 indicated no presence of the property and a rating of 5 indicated a heavy presence of the property. The ratings of all four glasses for each set were averaged and recorded.

The average spot, film and streak ratings were summed for an overall glassware appearance rating. The range of possible glassware ratings was thus from 3 to 15, with 3 being perfect and 15 being poor or heavy. An overall glassware rating of 5.0 or less was considered excellent. Spots, films and streaks are hard to see with the naked eye when their combined total is less than 5.0.

Examples

A series of cycles were run to determine a range of concentrate to permeate time ratios and a range of permeate rinse TDS concentrations in a rinse cycle that would result in glassware having acceptable spot, film and streak ratings. To determine the ranges, the concentrate to permeate time ratio and the permeate rinse TDS concentration were varied. The source of the concentrate rinse was wastewater from a reverse osmosis system.

Fresh rinse water entered the reverse osmosis system with a TDS concentration of about 450 ppm and was split into a concentrate rinse stream and a permeate rinse stream. The concentrate rinse stream and the permeate rinse stream were supplied during the rinse cycle of the institutional dishmachine for predetermined amounts of time. The concentrate rinse stream was first supplied into the institutional dishmachine for a predetermined amount of time during the rinse cycle, with the permeate rinse stream being supplied for the remainder of the rinse cycle. The entire rinse cycle time totaled 10 seconds. The concentrate to permeate time ratio and the TDS concentration of the permeate rinse were varied for each rinse cycle run. After the glasses were rinsed and allowed to dry, the spot, film and streak ratings were noted. Because the ratings are in part subjective, the runs were randomized to prevent bias.

Table 1 provides the concentrate rinse time and TDS concentration of the permeate of each run and the resulting spot, film and streak ratings of the dishware.

TABLE 1

| Run | Concentrate Rinse Time (sec) | Permeate Rinse TDS (ppm) | Spot Rating | Film Rating | Streak Rating | Summed Rating |
|---|---|---|---|---|---|---|
| Run 1 | 0 | 100 | 1 | 1.5 | 1.5 | 4 |
| Run 2 | 6 | 150 | 1 | 5 | 1.75 | 7.75 |
| Run 3 | 2 | 50 | 1 | 1.5 | 1 | 3.5 |
| Run 4 | 4 | 150 | 1 | 2.25 | 2 | 5.25 |
| Run 5 | 6 | 200 | 1.1 | 4 | 1.25 | 6.35 |
| Run 6 | 2 | 100 | 1 | 1 | 1.25 | 3.25 |
| Run 7 | 2 | 200 | 1 | 3 | 1.25 | 5.25 |
| Run 8 | 4 | 50 | 1 | 1.5 | 1 | 3.5 |
| Run 9 | 6 | 100 | 1 | 3 | 2 | 6 |
| Run 10 | 0 | 200 | 1 | 2.75 | 1.25 | 5 |
| Run 11 | 0 | 50 | 1 | 1.5 | 1.5 | 4 |
| Run 12 | 0 | 150 | 2 | 2.75 | 1.5 | 6.25 |
| Run 13 | 6 | 50 | 1 | 4.5 | 1.25 | 3.75 |
| Run 14 | 2 | 150 | 1 | 2.25 | 1.5 | 4.75 |
| Run 15 | 4 | 200 | 1 | 3 | 1.75 | 5.75 |
| Run 16 | 4 | 100 | 1 | 1.75 | 1.5 | 4.25 |
| Run 17 | 2 | 100 | 1 | 1.75 | 1.25 | 4 |
| Run 18 | 6 | 150 | 1 | 3.5 | 1.75 | 6.25 |
| Run 19 | 6 | 50 | 1 | 2.25 | 1.5 | 4.75 |
| Run 20 | 4 | 200 | 1 | 3.75 | 1.5 | 6.25 |
| Run 21 | 6 | 100 | 1 | 1.75 | 1.25 | 4 |
| Run 22 | 6 | 200 | 1 | 4 | 1.75 | 6.75 |
| Run 23 | 2 | 150 | 1 | 1.75 | 1.25 | 4 |
| Run 24 | 2 | 200 | 1 | 3.5 | 1.75 | 6.25 |
| Run 25 | 4 | 150 | 1 | 2.25 | 1.75 | 5 |
| Run 26 | 0 | 50 | 1 | 1 | 1 | 3 |
| Run 27 | 0 | 150 | 1 | 1.75 | 1.5 | 4.25 |
| Run 28 | 0 | 100 | 1 | 1.25 | 1 | 3.25 |
| Run 29 | 4 | 50 | 1 | 1.35 | 1 | 3.35 |
| Run 30 | 4 | 100 | 1 | 2 | 1.5 | 4.5 |
| Run 31 | 2 | 50 | 1 | 1.25 | 1 | 3.25 |
| Run 32 | 0 | 200 | 1 | 2.25 | 1.5 | 4.75 |

As can be seen in Table 1, a permeate rinse stream having a TDS concentration of about 100 or less resulted in substantially spot-free, film-free and streak-free glasses regardless of the concentrate rinse time. Based on these results, a more narrow range of runs ("second set of runs") were performed using the same method described above. The second set of runs had a total rinse cycle time of 10 seconds and used permeate rinse streams having a TDS concentration of about 50 ppm and about 100 ppm. Table 2 below provides the overall ratings for the various concentrate to permeate time ratios and TDS concentrations of the permeate rinse stream.

TABLE 2

| Concentrate Rinse Stream Time (sec) | Permeate Rinse Stream Time (sec) | Overall Glass Rating | |
|---|---|---|---|
| | | 50 ppm permeate | 100 ppm permeate |
| 0 | 10 | 3.5 | 3.62 |
| 2 | 8 | 3.38 | 3.62 |
| 4 | 6 | 3.42 | 4.38 |
| 6 | 4 | 4.25 | 5.0 |
| | | 750 ppm concentrate | |
| 10 | 0 | 10 | |

As illustrated in Table 2, glasses treated for the entire 10 second rinse cycle with a permeate rinse stream having a TDS concentration of about 50 ppm to about 100 ppm resulted in glasses with substantially no spots, films or streaks. The data in Table 2 also shows that slightly better results were obtained by using permeate rinse streams with a lower TDS concentration. That is, the overall appearance of the glassware was slightly better when the permeate rinse stream contained only about 50 ppm TDS compared to a permeate rinse stream that contained about 100 ppm TDS.

This was true even when the concentrate to permeate time ratio was slightly higher than the conventionally effective 1:1 time ratio. It was surprisingly discovered that excellent results could be achieved using up to about 6 seconds of concentrate followed by only about 4 seconds of permeate. While the overall glass ratings indicated that the glasses had substantially no spots, films or streaks with a 0 or 2 second concentrate rinse, followed by a 10 second or 8 second permeate rinse, respectively, the overall glass rating was still excellent with a 6 second concentrate rinse, followed by a 4 second permeate rinse. It was unexpected that the high-quality permeate rinse stream compensated for the long duration of the lower-quality concentrate rinse stream.

By comparison, when the entire 10 seconds of rinse cycle was conducted using only concentrate (about 750 ppm TDS), the resulting glasses had a rating of 10, or very poor.

The present invention is a zero waste reverse osmosis system that splits a water source that may have poor rinsing properties into a concentrated rinse stream and a purified rinse stream. By passing the water source through a reverse osmosis apparatus to concentrate the minerals in the water source into a first part of a rinse cycle and following with a purified water rinse, dishware washed with the water source are substantially spot-free, streak-free and film-free. This is true even though the properties of the original water source did not change. Because the wastewater produced by the reverse osmosis apparatus is also used to rinse the dishware, no water is wasted by the overall reverse osmosis system.

It should be noted that, as used in this specification and the appended claims, the singular forms "a," "an," and "the" include plural referents unless the content clearly dictates otherwise. Thus, for example, reference to a composition containing "a compound" includes a mixture of two or more compounds. It should also be noted that the term "or" is generally employed in its sense including "and/or" unless the content clearly dictates otherwise.

All publications and patent applications in this specification are indicative of the level of ordinary skill in the art to which this invention pertains. All publications and patent applications are herein incorporated by reference to the same extent as if each individual publication or patent application was specifically and individually indicated by reference.

The invention has been described with reference to various specific and preferred embodiments and techniques. However, it should be understood that many variations and modifications may be made while remaining within the spirit and scope of the invention.

The following is claimed:

1. A method of eliminating wastewater in a reverse osmosis apparatus that supplies water to an institutional dishmachine, the method comprising:
    introducing a water stream into the reverse osmosis apparatus to split the water stream into a permeate rinse stream and a concentrate rinse stream;
    rinsing dishware during a rinse cycle of the institutional dishmachine with the concentrate rinse stream; and
    rinsing the dishware during the rinse cycle of the institutional dishmachine with the permeate rinse stream after rinsing the dishware with the concentrate rinse stream.

2. The method of claim 1, wherein a ratio of the concentrate rinse stream to the permeate rinse stream is about 3:2 or less.

3. The method of claim 1, wherein the rinse cycle is completed in less than about 20 seconds.

4. The method of claim 1, wherein the permeate rinse stream has a total dissolved solids concentration of about 200 parts per million or less.

5. The method of claim 4, wherein the permeate rinse stream has a total dissolved solids concentration of about 100 parts per million or less.

6. The method of claim 1, further comprising heating the permeate rinse stream to at least about 180 degrees Fahrenheit.

7. A reverse osmosis system connectable to an institutional dishmachine, the system comprising:
    a fresh water supply;
    a reverse osmosis apparatus for splitting water from the fresh water supply of the dishmachine into a concentrate stream and a permeate stream;
    a concentrate storage tank and a permeate storage tank downstream of the reverse osmosis apparatus for receiving the concentrate stream and the permeate stream, respectively; and
    a control system for selectively controlling flow of the concentrate stream and flow of the permeate stream to a single cycle of the dishmachine such that the reverse osmosis system produces zero wastewater.

8. The reverse osmosis system of claim 7, wherein the reverse osmosis apparatus splits the water from the fresh water supply into the concentrate stream and the permeate stream at a ratio of about 3:2 or less.

9. The reverse osmosis system of claim 7, wherein the reverse osmosis apparatus splits the water from the fresh water supply such that the permeate stream has a total dissolved solids concentration of about 200 parts per million or less.

10. The reverse osmosis system of claim 9, wherein the reverse osmosis apparatus splits the water from the fresh water supply such that the permeate stream has a total dissolved solids concentration of about 100 parts per million or less.

11. The reverse osmosis system of claim 7, wherein the control system comprises a timer.

12. The reverse osmosis system of claim 7, further comprising a pressure switch connected to at least one of the concentrate storage tank and the permeate storage tank.

13. A system for regulating a reverse osmosis system to obtain zero wastewater, the system comprising:
    a fresh water supply;
    a reverse osmosis apparatus for filtering water from the fresh water supply into a concentrate rinse stream and a permeate rinse stream;
    a concentrate storage tank located downstream of the reverse osmosis apparatus for receiving the concentrate rinse stream;
    a permeate storage tank located downstream of the reverse osmosis apparatus for receiving the permeate rinse stream;
    an institutional dishmachine for receiving the concentrate rinse stream and the permeate rinse stream during a rinse cycle of the institutional dishmachine; and
    a control system configured to control flow of the concentrate rinse stream and the permeate rinse stream, respectively, into a single cycle of the institutional dishmachine.

14. The system of claim 13, wherein the concentrate rinse stream constitutes at least about 60% by volume of the rinse cycle.

15. The system of claim 13, wherein the concentrate rinse stream and the permeate rinse stream flow into the institutional dishmachine at a time ratio of about 3:2 or less.

16. The system of claim 13, wherein the permeate rinse stream has a total dissolved solids concentration of less than about 100 parts per million.

17. The system of claim 13, wherein the control system comprises a timer.

18. The system of claim 13, further comprising a pressure switch connected to at least one of the concentrate storage tank and the permeate storage tank.

19. The system of claim 13, wherein the rinse cycle lasts less than about 20 seconds.

20. The system of claim 13, further comprising a heater for heating the permeate rinse stream to a predetermined temperature.

* * * * *